United States Patent
Kajuluri et al.

(10) Patent No.: US 11,792,007 B2
(45) Date of Patent: Oct. 17, 2023

(54) SYSTEM AND METHOD FOR A VEHICLE NETWORK

(71) Applicant: Ford Global Technologies, LLC, Dearborn, MI (US)

(72) Inventors: Venkata Kishore Kajuluri, Southgate, MI (US); Xin Ye, Farmington Hills, MI (US); Bradley Warren Smith, Ann Arbor, MI (US); Jacob David Nelson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 17/203,775

(22) Filed: Mar. 17, 2021

(65) Prior Publication Data

US 2022/0303134 A1 Sep. 22, 2022

(51) Int. Cl.
*H04L 9/32* (2006.01)
*G06F 7/58* (2006.01)

(52) U.S. Cl.
CPC ............... *H04L 9/32* (2013.01); *G06F 7/588* (2013.01)

(58) Field of Classification Search
CPC .................................. H04L 9/32; G06F 7/588
USPC ......................................................... 713/168
See application file for complete search history.

(56) References Cited

U.S. PATENT DOCUMENTS

| 10,142,311 | B2 | 11/2018 | Oshida | |
|---|---|---|---|---|
| 10,419,907 | B2 | 9/2019 | Redding et al. | |
| 10,630,481 | B2 | 4/2020 | Lawlis et al. | |
| 2017/0034167 | A1* | 2/2017 | Figueira | ................ H04L 63/061 |
| 2018/0124180 | A1* | 5/2018 | Banno | ..................... H04L 67/12 |
| 2021/0288801 | A1* | 9/2021 | Kulkarni | ............... H04L 9/0631 |

OTHER PUBLICATIONS

Raza et al., "PRaCto: Pseudo Random bit generator for Cryptographic application", KSII Transactions on Internet and Information Systems vol. 12, No. 12, Dec. 2018, Copyright © 2018 KSII, http://doi.org/10.3837/tiis.2018.12.029, ISSN : 1976-7277.

* cited by examiner

*Primary Examiner* — Brandon Hoffman
*Assistant Examiner* — Sam Ambaye
(74) *Attorney, Agent, or Firm* — Brandon Hicks; Bejin Bieneman PLC

(57) ABSTRACT

An onboard communication network of a vehicle is monitored to detect a plurality of available messages that include respective cipher-based message authentication codes (CMAC) and that were identified as eligible messages based on having an information entropy greater than a specified threshold. A first message is selected from the plurality of available messages. The CMAC of the selected message is input into a random number generator that outputs a random number seeded by the CMAC of the selected message. Then the random number is provided.

18 Claims, 3 Drawing Sheets

SYSTEM AND METHOD FOR A VEHICLE NETWORK

BACKGROUND

Vehicles can be equipped with computers, networks, sensors and controllers to acquire data regarding the vehicle's environment and/or to operate vehicle components. Vehicle sensors can provide data about a vehicle's environment, e.g., concerning routes to be traveled and objects in the vehicle's environment to be avoided. Various computing devices such as electronic control units (ECUs) can be provided in a vehicle and can communicate via a vehicle network. Messages sent and received via the vehicle network can relate to operating the vehicle, and can include sensor data, actuation commands, fault reports, etc. A vehicle computing device can operate a vehicle and make real-time decisions based on data received from sensors and/or computing devices. This means that the integrity and authenticity of communications between the vehicle computing device and the sensors and/or computing devices, e.g., via a vehicle communication network, should be safeguarded.

Various controllers and the like (e.g., ECUs) on a vehicle network may require a random number for various security applications, e.g., to be used as a nonce or salt value. Typically, the seed value is selected from a source of noise in the system, e.g., analog to digital converters, to reduce a likelihood of an unauthorized source guessing the seed value. However, selecting the seed value from the source of noise may result in repeat values and/or may result in predictable changes between successive seed values, which can result in the unauthorized source being able to predict the seed value and thereby guess or predict the random number.

DETAILED DESCRIPTION

Figure 1:
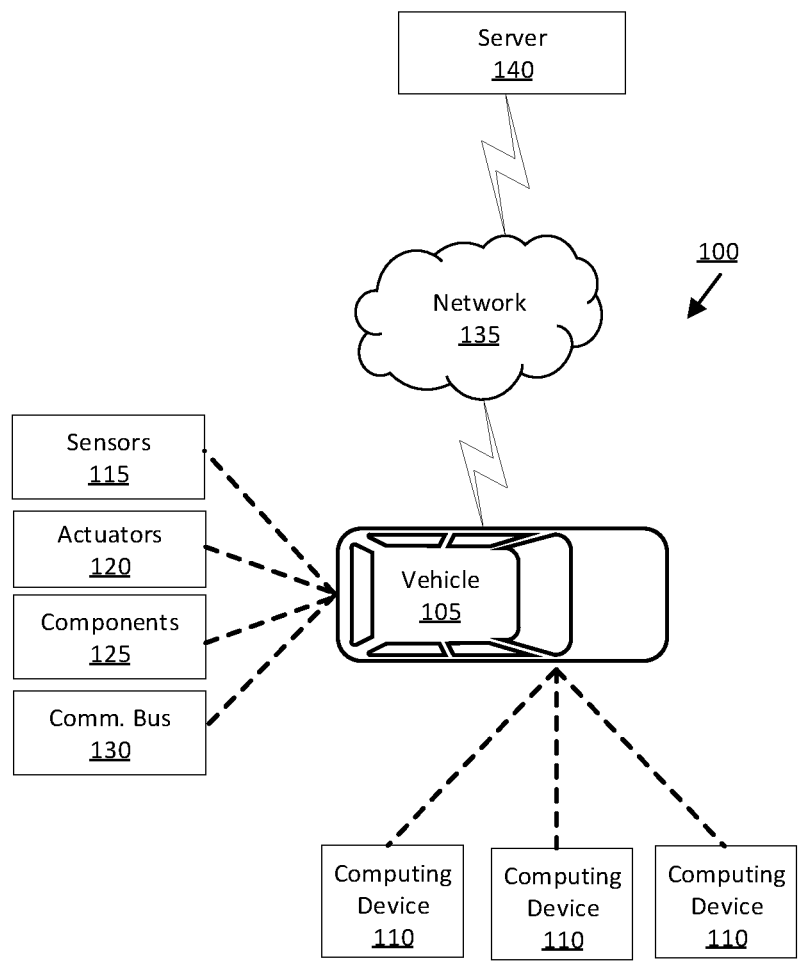
FIG. 1 is a block diagram illustrating an example vehicle control system for a vehicle.

A system includes a computer including a processor and a memory, the memory storing instructions executable by the processor to monitor an onboard communication network of a vehicle to detect a plurality of available messages that include respective cipher-based message authentication codes (CMAC) and that were identified as eligible messages based on having an information entropy greater than a specified threshold. The instructions further include instructions to select a first message from the plurality of available messages. The instructions further include instructions to input the CMAC of the selected message into a random number generator that outputs a random number seeded by the CMAC of the selected message. The instructions further include instructions to then output the random number.

The instructions can further include instructions to, upon determining a length of the CMAC of the selected message is less than a length of a seed value specified by the random number generator, select a second message from the plurality of available messages. The instructions can further include instructions to generate an updated CMAC by combining the CMAC of the second message and the CMAC of the first message. The instructions can further include instructions to input the updated CMAC into the random number generator based on determining a length of the updated CMAC is equal to the length of the seed value.

The instructions can further include instructions to maintain a list of the eligible messages on the vehicle communication network, and to incrementally select the first message from the list.

The instructions can further include instructions to remove messages from the list after a predetermined time.

The instructions can further include instructions to maintain a list of the eligible messages on the vehicle communication network, and to select the first message from on the list based on a previous random number.

The instructions can further include instructions to remove messages from the list after a predetermined time.

The random number may be input to an application for a security function.

The instructions can further include instructions to select the first message based on receiving a request for a random number.

The instructions can further include instructions to select, as the first message, a most recent available message detected on the onboard communication network after receiving the request.

The instructions can further include instructions to select, as the first message, a next available message detected on the onboard communication network after receiving the request.

A method includes monitoring an onboard communication network of a vehicle to detect a plurality of available messages that include respective cipher-based message authentication codes (CMAC) and that were identified as eligible messages based on having an information entropy greater than a specified threshold. The method further includes selecting a first message from the plurality of available messages. The method further includes inputting the CMAC of the selected message into a random number generator that outputs a random number seeded by the CMAC of the selected message. The method further includes then outputting the random number.

The method can further include, upon determining a length of the CMAC of the selected message is less than a length of a seed value specified by the random number generator, selecting a second message from the plurality of available messages. The method can further include generating an updated CMAC by combining the CMAC of the second message and the CMAC of the first message. The method can further include inputting the updated CMAC into the random number generator based on determining a length of the updated CMAC is equal to the length of the seed value.

The method can further include maintaining a list of the eligible messages on the vehicle communication network, and incrementally selecting the first message from the list.

The method can further include removing messages from the list after a predetermined time.

The method can further include maintaining a list of the eligible messages on the vehicle communication network, and selecting the eligible message from on the list based on a previous random number.

The method can further include removing messages from the list after a predetermined time.

The random number may be input to an application for a security function.

The method can further include selecting the message based on receiving a request for a random number.

The method can further include selecting, as the first message, a most recent available message detected on the onboard communication network after receiving the request.

The method can further include selecting, as the first message, a next available message detected on the onboard communication network after receiving the request.

Further disclosed herein is a computing device programmed to execute any of the above method steps. Yet further disclosed herein is a computer program product, including a computer readable medium storing instructions executable by a computer processor, to execute an of the above method steps.

As disclosed herein, it is possible to reduce the likelihood that an unauthorized source (i.e., a source other than one of the vehicle sensors or other authorized computing devices on a vehicle communication network) can compromise security of a vehicle network such as a Controller Area Network (CAN) bus. Advantageously, as disclosed herein, a vehicle computing device can generate a random number by selecting a seed value from one or more messages available on a vehicle communication network and seeding a random number generator.

The random number generator can output the random number based on the seed from the network message, e.g., for an application on the vehicle computing device that requires a random number. An "application" is programming stored in a memory and/or included in firmware of the vehicle computing device that includes instructions that a processor of the vehicle computing device executes to perform an operation. The application can require input of a random number. To generate the random number, the vehicle computing device can select an available message on the vehicle communication network; for example, messages can be eligible for selection based on being known to have been authenticated and based on an entropy of a message having been determined to be greater than a threshold, as explained further below. The selected message includes a cipher-based message authentication code (CMAC), which is unique to the message. The vehicle computing device can then obtain the random number as output from a random number generator seeded with the CMAC of the selected message. Therefore, different random numbers are generated based on different seed values that are selected. Because the CMAC of a message that has been transmitted and authenticated on a vehicle network, e.g., CAN bus, is unique to that message, selecting an available and eligible message and seeding the random number generator with the CMAC of the selected message prevents the random number generator from being seeded with repeat or guessable values, which can prevent unauthorized sources from precomputing the random number because it is computationally infeasible to pre-calculate all permutations of the CMAC associated with the selected message. Further, because the plurality of eligible messages on the vehicle communication network are updated at various times, e.g., as subsequent authenticated and eligible messages are provided to the vehicle communication network and therefore become available for selection, for an unauthorized source to determine the plurality of messages that were on the vehicle communication network when the vehicle computing device selected an available message will be computationally infeasible. Thus, the present technique can reduce or practically eliminate a risk that the unauthorized source can guess the selected message and thereby generate the random number output by the vehicle computing device.

Figure 2:
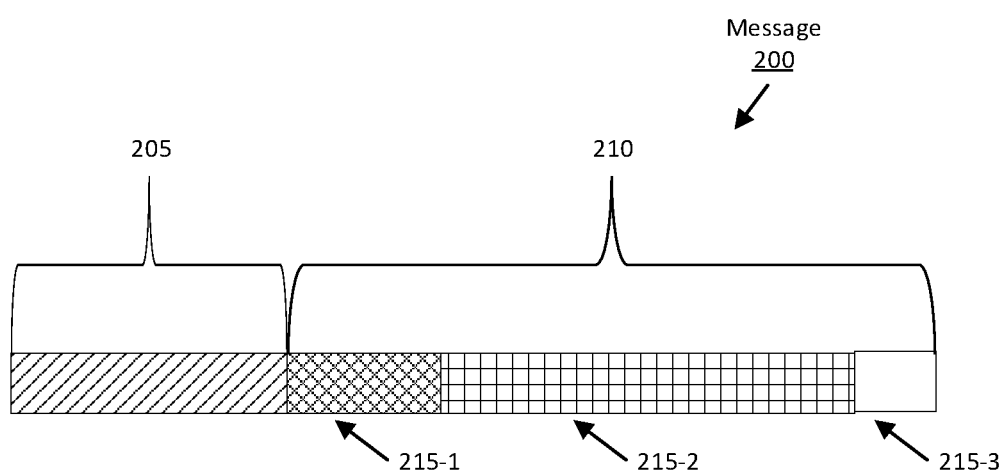
FIG. 2 is a block diagram illustrating an example message.

With reference to FIGS. 1-2, an example vehicle control system 100 includes a vehicle 105. A plurality of vehicle computing devices 110 in the vehicle 105 receive data from sensors 115. Each vehicle computing device 110 is programmed to monitor an onboard communication network of the vehicle 105 to detect a plurality of available messages that are designated eligible for providing a seed value, e.g., a cipher-based message authentication code (CMAC) for random number generation. In one example, messages that are authenticated and determined to exceed an entropy threshold can be designated eligible. Each vehicle computing device 110 is further programmed to select a first message from a plurality of available messages. Available messages are those that are eligible and that are currently obtainable from a vehicle network and/or a list, queue, or the like in which available messages are stored. A set of eligible messages can be predefined based on an information entropy of the messages being greater than a threshold. Information entropy in the context of this disclosure has the conventional meaning of that term in information theory, e.g., in the present context an information entropy of a message can be a number of bits in the message that cannot be determined before the message is sent. That is, messages used to provide data, e.g., a CMAC, for seeding a random number generator can be messages with a level of entropy sufficient to render attempts by a hacker or the like to predict or guess the message's contents, e.g., to spoof or intercept the message, computationally infeasible. Each vehicle computing device 110 is further programmed to input a seed value, e.g., the CMAC of the selected message 200, into a random number generator that outputs a random number seeded by the seed value. Each vehicle computing device 110 is further programmed to then output the random number.

Turning now to FIG. 1, the vehicle 105 includes the vehicle computing devices 110, sensors 115, actuators 120 to actuate various vehicle components 125, and a vehicle communications module 130. The communications module 130 allows the vehicle computing devices 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

Each vehicle computing device 110 includes a processor and a memory such as are known. The memory includes one or more forms of computer-readable media, and stores instructions executable by the vehicle computing device 110 for performing various operations, including as disclosed herein. Further, each vehicle computing device 110 can be a generic computer with a processor and memory as described above and/or may include a dedicated electronic circuit including an ASIC that is manufactured for a particular operation, e.g., an ASIC for processing sensor data and/or communicating the sensor data. In another example, each vehicle computing device 110 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in each vehicle computing device 110.

The vehicle computing devices 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computing devices 110; in a semi-autonomous mode the vehicle computing devices 110 controls one or two of vehicle 105 propulsion, braking, and steering; in a non-autonomous mode a human operator controls each of vehicle 105 propulsion, braking, and steering.

The vehicle computing devices 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computing devices 110, as opposed to a human operator, are to control such operations.

The vehicle computing devices 110 may include or be communicatively coupled to, e.g., via a vehicle communication network such as a communications bus as described further below, more than one processor, e.g., a computing device 110 can be an electronic control unit (ECU) or the like included in the vehicle 105 for monitoring and/or controlling various vehicle components 125, e.g., a transmission controller, a brake controller, a steering controller, etc. The vehicle computing devices 110 are generally arranged for communications on a vehicle communication network that can include a bus in the vehicle 105 such as a controller area network (CAN) or the like, and/or other wired and/or wireless mechanisms.

Via the vehicle 105 network, each vehicle computing device 110 may transmit messages to various devices in the vehicle 105 and/or receive messages (e.g., CAN messages) from the various devices, e.g., sensors 115, an actuator 120, other vehicle computing devices 110, etc. Further, as mentioned below, various controllers and/or sensors 115 may provide data to the vehicle computing devices 110 via the vehicle communication network.

Vehicle 105 sensors 115 may include a variety of devices such as are known to provide data to the vehicle computing devices 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

Each vehicle computing device 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computing devices 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by communication module 130 according to any suitable short-range communications mechanism, e.g., DSRC, cellular, or the like.

The network 135 represents one or more mechanisms by which a vehicle computing device 110 may communicate with remote computing devices, e.g., the remote server computer 140, a remote vehicle computing device, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Each computing device 110 is programmed to provide messages 200 to the other vehicle computing devices 110. For example, each vehicle computing device 110 can generate a message 200 and transmit the message 200 to the other vehicle computing devices 110, e.g., via the vehicle communication network. A message 200 typically includes a header 205 and a payload 210 (see FIG. 2). The header 205 includes a counter. A counter is a unique identifier for the message 200. The counter may, for example, indicate a number of messages 200 that have been transmitted via the vehicle communication network. The counter can be stored, e.g., in respective memories of the vehicle computing devices 110. Upon detecting a message 200 on the vehicle communication network, each computing device 110 can increment the counter stored in the respective memory. Additionally, the header 205 may include a source identifier, e.g., an alphanumeric string of characters that identifies the vehicle computing device 110 that generated the message 200, a message type, a message size, etc.

The payload 210 may include various data, i.e., message content. The computing devices 110 may generate the payload based on sensor 115 data. For example, the computing devices 110 may receive data from one or more sensors 115 monitoring at least one vehicle component 125. As is known, upon obtaining the sensor 115 data, the computing devices 110 can be programmed to encode and serialize, i.e., convert to a string of bits, data, such as data describing objects, data describing vehicle 105 operating conditions such as speed, heading, etc., data about a vehicle's 105 planned route, etc., so that the data can be included as the payload in the message 200. The payload can include sub-payloads or payload segments 215-1, 215-2, 215-3 (collectively, referred to as payload segments 215). Each payload segment 215 can include data about a detected object from sensor 115 data, e.g., an object identifier, object dimensions, an object location, an object velocity, etc. The respective payload segments 215 in FIG. 2 are illustrated as being of different lengths to reflect that a computing device 110 may generate varying amounts of data for different objects, and therefore different payload segments 215 may be of different sizes.

Vehicle computing devices 110 can be programmed to monitor a vehicle communication network to detect a predefined set of eligible messages 200. The predefined set of eligible messages 200 may be a subset, i.e., some but less than all, of a plurality of messages 200 that could be provided on the vehicle communication network. That is, at least some of the messages 200 on the vehicle communication network may not satisfy criteria (e.g., have sufficient entropy) for predefining as an eligible message 200, i.e., may be ineligible messages 200. Each vehicle computing device 110 is programmed to generate a random number by using an available eligible message 200. If a vehicle computing device 110 fails to detect any eligible messages 200 (e.g., if the vehicle computing device 110 is connected to a test bench) the vehicle computing device 110 may prevent generation of the random number.

The set of eligible messages 200 can be predefined, in addition to consideration of information entropy as noted above and further discussed below, based on the messages 200 deemed to have been authenticated. A message 200 is typically authenticated by the vehicle computing device 110 that generated the message 200 prior to being provided on the vehicle communication network. An authenticated message 200 includes a CMAC in the payload 210, e.g., as a payload segment 215, of the message 200. That is, a message 200 can be deemed to have been authenticated based on detecting the message 200 on the vehicle communication network and identifying a CMAC included in the message 200. For example, the CMAC can be included in a payload segment 215 that is specified, e.g., by a vehicle 105 and/or component 125 manufacturer. The specified payload segment 215 can be stored, e.g., in memories of the respective vehicle computing devices 110. At least some of the vehicle computing devices 110 can transmit authenticated messages 200 to other vehicle computing devices 110, e.g., via the vehicle communication network.

A CMAC can be generated based on the message 200, e.g., the header 205 and the payload 210, as discussed below. The CMAC is unique for each message 200 because each message 200 is unique. That is, different CMACs are generated for different messages 200. Specifically, each message 200 has a unique header 205 because the vehicle computing devices 110 increment the counter upon detecting a message 200 on the vehicle communication network. Accordingly, no two messages 200 can include the same data in the respective headers 205 and payloads 210. Therefore, the CMACs generated from corresponding messages 200 will be different.

To generate the CMAC, the vehicle computing device 110 that generated the message 200 can input the message 200 and an authentication key to a permutation program. The permutation program (sometimes called a permutation generator) can be a conventional cryptographic program, e.g., an Advanced Encryption Standard (AES) algorithm. That is, the permutation program rearranges the data in the message 200 in an order that is specified by the authentication key. That is, the permutation program performs, for each portion of the message 200 (e.g., the header 205 and the payload 210), one or more of a substitution, a rearranging, or a mathematical operation according to block ciphers generated from the authentication key. For example, if the permutation program is an AES algorithm, the computing device 110 can identify a 16-bit portion of the message 200, apply an "exclusive-or" function (i.e., an XOR function) between the 16-bit portion and a portion of the authentication key to generate a first round string, and arrange first round string into a 4×4 grid. Then, the vehicle computing device 110 can perform one of (1) shift respective positions of bits within the rows of the 4×4 grid, (2) substitute one of the bits in the 4×4 grid with a known substitution bit, (3) shift respective positions of bits within the columns of the 4×4 grid, or (4) scaling values of the bits by predetermined integers. The shifting, scaling, and substitution algorithms are determined according to the specific permutation program. The vehicle computing device 110 can perform the permutation program for the message 200 to generate the CMAC.

The vehicle computing device 110 can retrieve the authentication key, e.g., from the memory of the vehicle computing device 110. The authentication key is a predetermined set of alphanumeric characters. For example, the authentication key can be a cryptographic key used in a conventional cryptographic program, e.g., Diffie-Hillman exchange, RSA encryption, AES, etc. The authentication key can be specified, e.g., by a manufacturer of the vehicle 105 and/or a computing device 110. Each vehicle computing device 110 can receive the authentication key from the remote server computer 140, e.g., via the network 135, and can store the authentication key, e.g., in a respective memory.

Additionally, the set of eligible messages 200 are predefined based on an information entropy of the messages 200 being greater than a threshold. That is, the eligible messages 200 can be authenticated messages 200 that satisfy the threshold for information entropy. As set forth above, information entropy in the context of this disclosure has the conventional meaning of that term in information theory, e.g., in the present context an information entropy of a message can be a number of bits in the message that cannot be determined before the message is sent. The threshold may be determined such that it is computationally infeasible for an unauthorized source to guess the eligible message 200 or the content of the eligible message 200. As used herein, an "unauthorized source" is a computing device that is not authorized to access the vehicle communication network, e.g., to share data with the vehicle computing devices 110, sensors 115, etc. on the vehicle communication network.

Upon detecting the eligible message 200, the vehicle computing device 110 can include the eligible message 200 in e.g., a list, a table, a queue, or the like of available messages 200. The list can be stored in a memory of the vehicle computing device 110 and may maintain active messages 200 (i.e., currently on the vehicle communication network) or recent messages 200 (i.e., removed from the vehicle communication network within a predetermined time period), as available messages 200. For example, the vehicle computing device 110 can remove messages 200 from the list that are no longer on the vehicle communication network. As another example, the vehicle computing device 110 can remove messages 200 from the list after a predetermined time period, e.g., 10 milliseconds, 100 milliseconds, 1 second, etc. As another example, the vehicle computing device 110 can maintain available messages 200 on the list until a predetermined maximum number of available messages 200 are maintained on the list. In such an example, the vehicle computing device 110 can remove an oldest, i.e., first in time, message 200 upon detecting a newest, i.e., last in time, available message 200 on the vehicle communication network. The list may include an index, e.g., a numerical value, associated with each available message 200. The list may be stored, e.g., in the memory of the vehicle computing device 110.

Each vehicle computing device 110 is programmed to receive a request for a random number, e.g., from an application or possibly a second computing device. For example, a vehicle computing device 110 can receive one or more requests from one or more applications of the vehicle computing device 110. As another example, the vehicle computing device 110 can receive, via the vehicle communication network, one or more requests from one or more requesting computing devices. The request may include the source identifier (as discussed above) of the requesting computing device. In such an example, the vehicle computing device 110 can identify the requesting computing device based on the source identifier included in the request.

Upon receiving a request for a random number, the vehicle computing device 110 selects a first available message 200 from the list or queue. Alternatively, the vehicle computing device 110 may not maintain a queue or list of available messages, but could select a most recent (or the next) available message 200 detected on the vehicle communication network after receiving the request.

In one example, the vehicle computing device 110 can select the first available message 200 from a list. In such an example, the vehicle computing device 110 can, for example, incrementally select the first available message 200 from the list. As another example, the vehicle computing device 110 can select the first available message 200 based on a previously generated random number. In such an example, the vehicle computing device 110 can select numbers from one or more positions (e.g., specified by a vehicle 105 and/or component manufacturer) of the previous random number and select the available message 200 associated with an index that matches the selected number(s).

After selecting a first available eligible message 200, the vehicle computing device 110 then identifies the CMAC of the selected message 200, e.g., based on the specified payload segment 215. For example, the vehicle computing device 110 can access the specified payload segment 215 and retrieve the CMAC. The vehicle computing device 110 inputs the identified CMAC into a random number generator to generate a plurality of numbers. A "random number generator" is an algorithm that generates a sequence of numbers when seeded with an initial value, i.e., the identified CMAC of the selected authenticated message. That is, the random number generator (RNG) is a deterministic algorithm that generates a specified sequence for each identified CMAC; in the context of the present document, references to a random number generator are to what is understood in the computer arts as a "pseudo-random number generator," i.e., a number generator that generates a sequence of numbers based on an initial seed number. Said differently, the vehicle computing device 110 can generate a sequence of random (or pseudorandom) numbers based on the identified CMAC by using the RNG. The RNG can be a conventional algorithm, e.g., a Lehmer generator, a Mersenne Twister, an Advanced Randomization System, Philox, etc. In this document, "seed" has its conventional meaning in the computer arts, i.e., in the present context, to "seed" means specifying an initial condition of the RNG algorithm, which initializes the random number generator to generate a specific sequence of numbers based on the specific initial condition, i.e., seed value.

The RNG specifies a length, e.g., a number of bits, of a seed, i.e., initial, value. Each vehicle computing device 110 may store length of the seed value, e.g., in a memory of the respective vehicle computing device 110. The vehicle computing device 110 determines a number of available eligible messages 200 needed to seed the RNG based on the length of the seed and a length, e.g., a number of bits, of the CMAC of the selected message 200.

Upon identifying the CMAC of the selected message 200, the vehicle computing device 110 can compare the length of the identified CMAC to the length of the seed value. If the length of the identified CMAC is equal to the length of the seed value, then the vehicle computing device 110 inputs the identified CMAC into the RNG, i.e., seeds the RNG with the identified CMAC.

If the length of the identified CMAC is greater than the length of the seed value, then the vehicle computing 110 can generate an updated CMAC by removing, from the identified CMAC, a number of bits corresponding to a difference between the length of the identified CMAC and the length of the seed value. In this situation, the vehicle computing 110 can, for example, remove the number of bits corresponding to the difference randomly from the identified CMAC, i.e., remove random bits from the identified CMAC. As another example, the vehicle computing device 110 can remove consecutive bits corresponding to the difference, e.g., beginning with a first bit or ending with a last bit of the identified CMAC. The vehicle computing device 110 can then input the updated CMAC into the RNG, i.e., seeds the RNG with the updated CMAC.

If the length of the identified CMAC is less than the length of the seed value, then the vehicle computing device 110 can select a second available message 200 from the predefined set of available eligible messages 200, e.g., in substantially the same manner as discussed above regarding selecting the available message 200. The vehicle computing device 110 can then identify a second CMAC of the second selected message 200, e.g., in substantially the same manner as described above regarding identifying the CMAC. Upon identifying the second CMAC, the vehicle computing device 110 can generate an updated CMAC by combining the identified CMAC and the second identified CMAC. For example, the vehicle computing device 110 can concatenate the identified CMAC and the second identified CMAC.

As another example, the vehicle computing device 110 can select a number of bits from the second identified CMAC corresponding to a difference between the length of the identified CMAC and the length of the seed value. In this situation, the vehicle computing device 110 can, for example, select the number of bits corresponding to the difference randomly from the second identified CMAC, i.e., select random bits from the second identified CMAC.

As another example, the vehicle computing device 110 can select the number of consecutive bits corresponding to the difference, e.g., beginning with a first bit or ending with a last bit of the second identified CMAC. The vehicle computing device 110 can then concatenate the selected bits from the second identified CMAC and the identified CMAC. The vehicle computing device 110 can combine subsequently identified CMACs until the length of the updated CMAC equals the length of the seed value. The vehicle computing device 110 then inputs the updated CMAC into the RNG, i.e., seeds the RNG with the updated CMAC.

Upon generating the random number, the vehicle computing device 110 is programmed to output the random number, e.g., to an application or possibly to a second computing device requesting a random number and/or seed value via the vehicle network. The requesting computing device or application can, for example, use the random number for a cryptographic and/or security function. For example, the random number may be used as a nonce value that is appended to data in a message prior to encrypting and transmitting the message. Use of a nonce can create a unique message, and is a technique to prevent a hacker form copying and using (or reusing) an encrypted communication. That is, because a nonce is unique to the message in which it is included, combining message data with the nonce can allow spoofed messages to be identified based on receiving a message that includes a previous cryptographic nonce.

As another example, the random number may be used as a salt value. In such an example, the random number and the data may be combined using the cryptographic program that inputs the random number and data into a cryptographic hash function such as Secure Hash Algorithm 1 (SHA-1), to generate a hash (i.e., an encrypted bit string of a fixed size). Because each salt is unique to the message in which it is included, combing the data with the salt can prevent unauthorized sources from precomputing the hash because it is computationally infeasible to pre-calculate all permutations of the salt.

Figure 3:
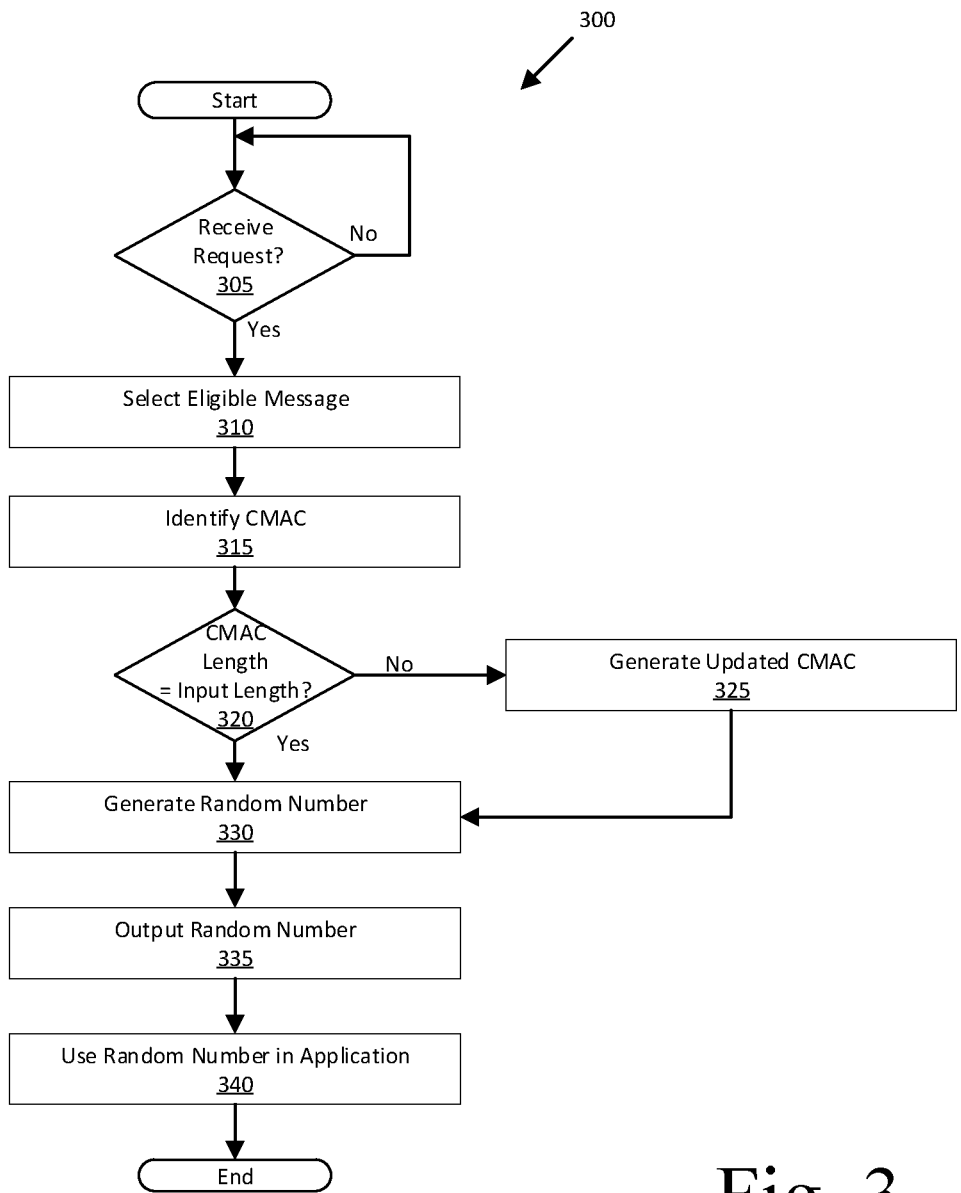
FIG. 3 is flowchart of an example process for seeding and generating a random number.

FIG. 3 is a diagram of an example process 300 for seeding and generating a random number. The process 300 begins in a block 305. The process 300 can be carried out by a vehicle computing device 110 included in a vehicle 105 executing program instructions stored in a memory thereof.

In the block 305, a vehicle computing device 110 determines whether a request for a random number (as discussed above) is received, e.g., from an application or a second computing device. For example, the vehicle computing device 110 can monitor the vehicle communication network to detect the request. If the vehicle computing device 110 receives a request for a random number, then the process 300 continues in a block 310. Otherwise, the process 300 remains in the block 305.

In the block 310, the vehicle computing device 110 monitors the vehicle communication network to detect a plurality of eligible messages 200. For example, the eligible messages 200 can be provided by one or more computing devices 110, as discussed above. The vehicle computing device 110 can select a first eligible message 200 on the vehicle communication network or from a stored queue or list of available eligible messages 200, as discussed above. The process 300 continues in a block 315.

In the block 315, the vehicle computing device 110 identifies a cipher-based message authentication code (CMAC) of the selected available eligible message 200. The available eligible message 200 includes the CMAC in a specified payload segment 215, as discussed above. The vehicle computing device 110 can access the specified payload segment 215 and retrieve the CMAC, as discussed above. The process 300 continues in a block 320.

In the block 320, the vehicle computing device 110 compares a length of the identified CMAC to a length of a seed value for a random number generator (RNG), as discussed above. The length of the seed value may be stored, e.g., in a memory of the vehicle computing device 110. If the length of the identified CMAC is equal to the length of the seed value, then the process 300 continues in a block 330. Otherwise, the process 300 continues in a block 325.

In the block 325, the vehicle computing device 110 generates an updated CMAC. For example, when the length of the identified CMAC is greater than the length of the seed value, the vehicle computing device 110 can update the identified CMAC by removing a number of bits from the CMAC corresponding to a difference between the length of the identified CMAC and the length of the seed value, as discussed above.

As another example, when the length of the identified CMAC is less than the length of the seed value, the vehicle computing device 110 can select a second available message 200 and identify a second CMAC from the second selected message 200, as discussed above. The vehicle computing device 110 can then generate an updated CMAC by combining the second identified CMAC and the identified CMAC, as discussed above. Alternatively or additionally, when the length of the identified CMAC is less than the length of the seed value, the computing device 110 could provide additional bits, e.g., a predetermined pattern of zeros and/or ones, to obtain the desired length. The process 300 continues in the block 330.

In the block 330, the vehicle computing device 110 inputs the identified (or updated) CMAC and an authentication key, e.g., stored in a memory of the vehicle computing device 110, into the RNG to generate a sequence of numbers, as discussed above. In other words, the vehicle computing device 110 seeds the RNG with the identified (or updated) CMAC. As set forth above, the RNG is a deterministic algorithm that generates a specified sequence for each identified (or updated) CMAC. That is, the RNG outputs a random (or pseudorandom) number based on the identified (or updated) CMAC. The process 300 continues in a block 335.

In the block 335, the vehicle computing device 110 outputs the random number, e.g., to the requesting computing device or application. The vehicle computing device 110 may transmit the random number, e.g., via the vehicle communication network or the network 135. The process 300 continues in a block 340.

In a block 340, the computing device 110 requesting the random number uses the random number in an application, e.g., for a secure function such as including a nonce value in an encrypted communication, salting a hash function, etc. The process 300 ends following the block 340.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory (RAM), etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   monitor an onboard communication network of a vehicle to detect a plurality of available messages that include respective cipher-based message authentication codes (CMAC) and that were identified as eligible messages based on having a number of bits in the respective message that cannot be determined before the message is sent greater than a specified threshold;
   select a first message from the plurality of available messages;
   upon determining a length of the CMAC of the selected message is less than a length of a seed value specified by a random number generator that outputs a random number, select a second message from the plurality of available messages;
   generate an updated CMAC by combining the CMAC of the second message and the CMAC of the first message;
   input the updated CMAC into the random number generator based on determining a length of the updated CMAC is equal to the length of the seed value; and
   then output the random number.

2. The system of claim 1, wherein the instructions further include instructions to maintain a list of the eligible messages on the vehicle communication network, and to incrementally select the first message from the list.

3. The system of claim 2, wherein the instructions further include instructions to remove messages from the list after a predetermined time.

4. The system of claim 1, wherein the instructions further include instructions to maintain a list of the eligible messages on the vehicle communication network, and to select the first message from the list based on a previous random number.

5. The system of claim 4, wherein the instructions further include instructions to remove messages from the list after a predetermined time.

6. The system of claim 1, wherein the random number is input to an application for a security function.

7. The system of claim 1, wherein the instructions further include instructions to select the first message based on receiving a request for a random number.

8. The system of claim 7, wherein the instructions further include instructions to select, as the first message, a most recent available message detected on the onboard communication network after receiving the request.

9. The system of claim 8, wherein the instructions further include instructions to select, as the first message, a next available message detected on the onboard communication network after receiving the request.

10. A method, comprising:
    monitoring an onboard communication network of a vehicle to detect a plurality of available messages that include respective cipher-based message authentication codes (CMAC) and that were identified as eligible messages based on having a number of bits in the respective message that cannot be determined before the message is sent greater than a specified threshold;
    selecting a first message from the plurality of available messages;
    inputting the CMAC of the selected message into a random number generator that outputs a random number seeded by the CMAC of the selected message;
    upon determining a length of the CMAC of the selected message is less than a length of a seed value specified by a random number generator that outputs a random number, selecting a second message from the plurality of available messages;
    generating an updated CMAC by combining the CMAC of the second message and the CMAC of the first message;
    inputting the updated CMAC into the random number generator based on determining a length of the updated CMAC is equal to the length of the seed value; and
    then outputting the random number.

11. The method of claim 10, further comprising maintaining a list of the eligible messages on the vehicle communication network, and incrementally selecting the first message from the list.

12. The method of claim 11, further comprising removing messages from the list after a predetermined time.

13. The method of claim 10, further comprising maintaining a list of the eligible messages on the vehicle communication network, and selecting the eligible message from the list based on a previous random number.

14. The method of claim 13, further comprising removing messages from the list after a predetermined time.

15. The method of claim 11, wherein the random number is input to an application for a security function.

16. The method of claim 10, further comprising selecting the message based on receiving a request for a random number.

17. The method of claim 16, further comprising selecting, as the first message, a most recent available message detected on the onboard communication network after receiving the request.

18. The method of claim 16, further comprising selecting, as the first message, a next available message detected on the onboard communication network after receiving the request.

* * * * *